June 4, 1968     D. BLITZ     3,387,300

NEGATIVE TIME DETECTION SYSTEMS

Filed Feb. 13, 1967     2 Sheets-Sheet 1

INVENTOR

DANIEL BLITZ

By Richard J. Seligman

ATTORNEY

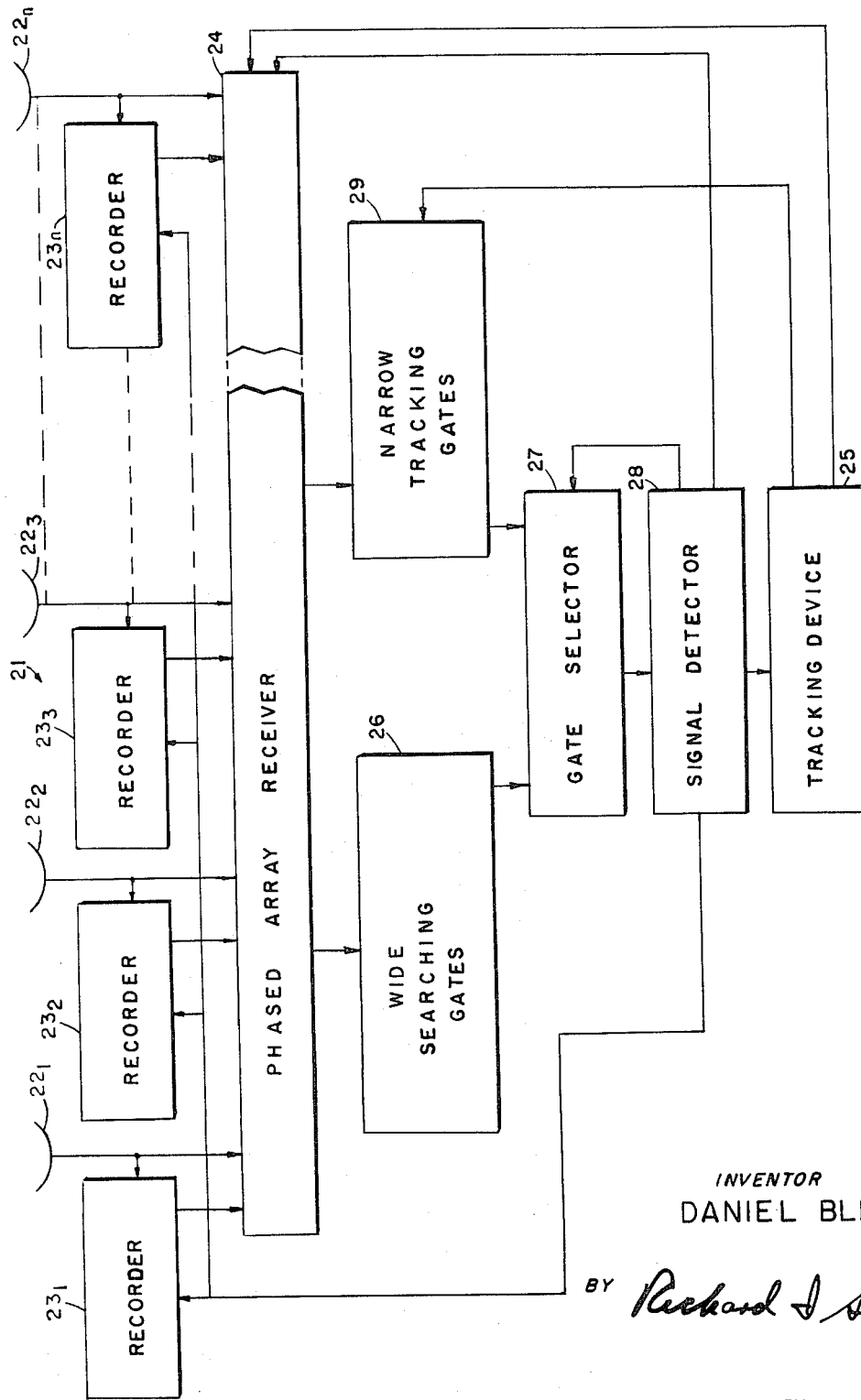

United States Patent Office 3,387,300
Patented June 4, 1968

3,387,300
NEGATIVE TIME DETECTION SYSTEMS
Daniel Blitz, Boston, Mass., assignor to Sanders Associates, Inc., Nashua, N.H., a corporation of Delaware
Filed Feb. 13, 1967, Ser. No. 615,780
12 Claims. (Cl. 343—7.3)

ABSTRACT OF THE DISCLOSURE

Apparatus is herein disclosed for determining the path (or other information) of a target approaching from a distance, especially that portion of the path (or other information) traversed (occurring) when the target signal is too weak to conventionally detect. The apparatus includes conventional radar (or sonar or other detection) equipment for searching for the target, using preferably broadband gating circuitry. The signal outputs from the broadband circuits, which are applied to tracking and detection circuitry, are also recorded. Once a target has been detected, the gating is adjusted and narrowed, and the recorded prior-to-detection signals are played backward through the narrow gating. At increased signal-to-noise ratio, the target can be tracked backward in time to ranges greater than that originally detectable with the broadband gating. Alternatively, searching can be conducted with a single searching narrow gate, the negative tracking being carried out within the properly positioned narrow gate after initial detection has occurred.

Background of the invention

Radar systems are frequently utilized for tracking the trajectory of targets. With some knowledge as to the partial trajectory of a target, for example, a mortar shell, the source from whence the target came can be calculated. When the target is far removed from the radar and its signal (echo from the incident signal) is too weak to detect, its range, direction and velocity are unknown. The radar must therefore examine both range and velocity with broadband circuits. Once the target has been detected, any velocity and range gating can be narrowed.

Prior to target detection, wide gating is usually employed, and, associated therewith, the accompanying low signal-to-noise ratios make detection normally difficult, if not impossible, beyond certain limits. Of course, it would be possible to initially search employing narrow gatings, but this is very time-consuming and, as a practical matter, uses time which cannot be afforded. When searching with narrow gating, in the time it takes to scan all the way through all possible signals, the target could have come and gone.

Conventional radar systems employ broadband circuitry to search for targets. Once a target is detected, the radar tracks it in order to find its path. This information, the path of the target (for example, a mortar shell), can be fed into a computer for extrapolating to the initial part of the trajectory, that portion occurring prior to detection. The longer it takes to acquire the target (the farther from its source), the further must be the extrapolation, the greater must be the accuracy of the data fed into the computer; the more complicated the computation required, and the greater the chance for error. Hence, the ultimate in performance would be to acquire (detect) the target (shell) immediately subsequent its ejection from the mortar; and thus no extrapolation calculation would be required.

The more information available on the early history of the target, the easier to determine where it was in the past and how it was performing in the past.

The problem also exists with respect to locating the source of any travelling object, whether it be a missile having a regular trajectory, or simply an airplane traversing an irregular course. In many instances, it would be beneficial to ascertain any course travelled by a target prior to the initial detection thereof. It often is required to determine the prior direction of an aircraft or the launch source of, for example, an ICBM. If pre-detection information can be obtained on the target, then once detection occurs, the pre-detection information can be examined more critically.

Summary of the invention

Briefly, the invention comprises detection apparatus for determining target information which existed prior to the initial detection thereof. This is accomplished by storing incoming signals until the target is initially detected. Upon detection, the equipment is sufficiently apprised of information so as to permit tracking of the target using properly positioned narrow gating. Furthermore, with the properly positioned narrow gating, the previously stored information can be used, since signal-to-noise ratios will be substantially increased; and, thus, the target can be tracked backward in time within the narrow gates.

Accordingly, it is an object of this invention to provide an improved detection system.

It is another object of this invention to provide a detection system for determining the early information, about a target, which existed prior to initial detection thereof.

It is a further object of this invention to provide a negative time detection system.

Brief description of the drawings

The above-mentioned and other features and objects of this invention will become more apparent by reference to the following description, taken in conjunction with the accompanying drawings, in which:

FIG. 3 is a block diagram of a negative time phased array radar system.

Description of the preferred embodiment

Figure 1:
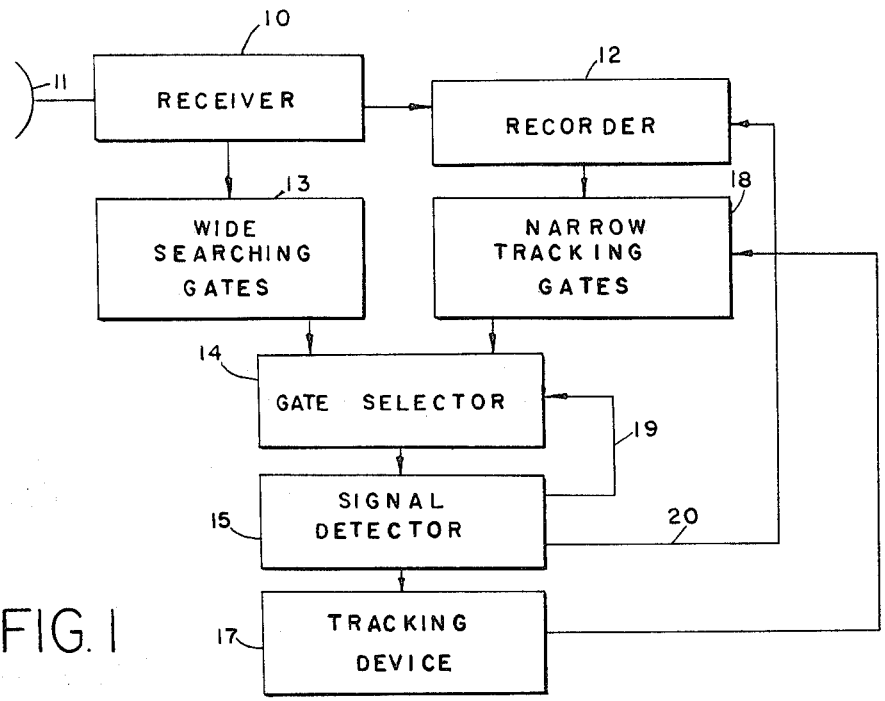
FIG. 1 is a block diagram of an embodiment of a negative time radar system.

Referring to FIG. 1, there is represented thereby a simplified block diagram of a negative time radar system embodying the concepts of the invention.

A receiver 10 is coupled to a receiving antenna 11. The raw output from receiver 10 is applied to a recording device 12 and simultaneously to wide searching gates 13. The outputs from wide searching gates 13 pass through a gate selector 14 to a signal detector 15, with an output from signal detector 15 being applied to a tracking device 17. Tracking device 17 supplies an output to narrow tracking gates 18.

Signal detector 15 has an output 19 to a gate selector 14 and an output 20 to recorder 12. The output from recorder 12 is applied to narrow tracking gates 18, the outputs from which are applied to tracking device 17 via gate selector 14 and signal detector 15.

The above-mentioned components are those generally found in conventional radar systems, with the major exception of recorder 12. Preferably, recorder 12 is designed for continuous operation; that is, it contains a continuous loop of magnetic tape, making rewinding unnecessary, or the recording medium is a revolving magnetic disk.

When a target is far removed from the site of the radar equipment, incoming signals picked up by antenna 11 and receiver 10 are applied to tracking device 17 via wide searching gates 13, gate selector 14 and signal detector 15, and simultaneously applied to recorder 12 for recording thereof.

When a sufficiently strong signal is acquired, as acknowledged by signal detector 15, which establishes the presence of the incoming signals, tracking device 17 centers narrow tracking gates 18 on the signal. An output 19 from signal detector 15 causes gate selector 14 to switch the inputs to signal detector 15 and tracking device 17 from the outputs of wide searching gates 13 to the outputs from narrow tracking gates 18. Also, a signal from signal detector 15 reverses the direction of recorder 12 and switches the recorder from record to playback. Thus, the signal previously stored in recorder 12 is played backward through the narrow tracking gates 18, through gate selector 14 and into signal detector 15 and tracking device 17 at a substantially increased signal-to-noise ratio.

Gate selector 14 can be a simple switch arrangement for manual operation or, alternatively, a relay for automatic operation.

Once a target has approached a point where its signal is sufficient to actuate detection circuits, the previously recorded information is played back in reverse, and the target thus tracked backward in time. With the aid of the accurately positioned narrow tracking gates 18, the signal-to-noise ratio is so greatly enhanced that pre-detection target information can be utilized by observing the tracking device. The maximum range of target information is so greatly extended that there is no need for further radar observation after initial detection to determine path direction. The further back in time the target (projectile) can be tracked, the less extrapolation to its place of origin is required, the less complex need be the computer, and the more accurate will be the knowledge of its origin.

The gating circuits examine range and velocity information. During search, wide range gates are required (e.g., 1000 feet deep), yet once a target is acquired, the range gates can be narrowed (e.g., to ten feet) and thus gain significant signal-to-noise advantage. Likewise, with Doppler, initially a Doppler bandwidth a thousand cycles wide might be used because of the unknown target speed. However, once the target is acquired and the speed measured, the gating can be narrowed to, e.g., 10 cycles wide, thus increasing signal-to-noise ratio by 100 times.

Figure 2:
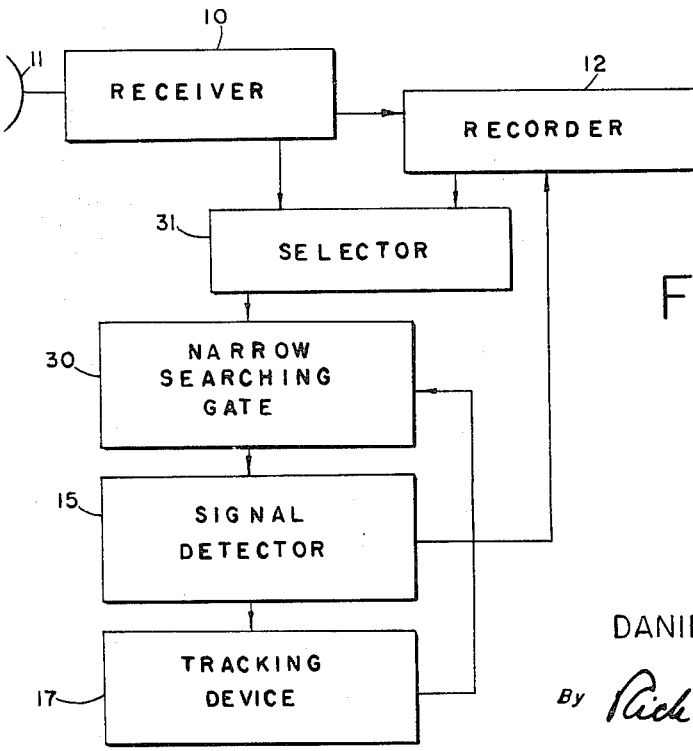
FIG. 2 is a block diagram of a second embodiment of a negative time radar system.

A second embodiment for a negative time radar system is illustrated by the block diagram of FIG. 2. Rather than employing wide gates for the search mode, a single narrow gate 30 is used.

The raw output from a receiver 10 is stored by a recorder 12 and simultaneously applied to a tracking device 17 via selector 31, narrow gate 30, and a signal detector 15. The narrow gate 30 is caused to progressively search incoming signals over a wide range of interest. Upon receiving a detectable signal, signal detector 15 causes the direction of recorder 12 to be reversed and to be switched from the record to playback mode, as described hereinbefore, while tracking device 17 positions the narrow gate through which the output from recorder 12 is to be examined. Recorder 12 has stored the data received while the narrow gate was incorrectly positioned. The selector 31 switches the output to the narrow gate from receiver 10 to recorder 12. Employing negative time principles, the time lost in searching with a narrow gate is regained.

This scheme for a negative time radar is also applicable to a phased array radar. Instead of a single recorder, a plurality of recorders is used. Each antenna element on the phased array radar has its corresponding recorder to store the raw signals incident thereat. As before, the signals are recorded until detection, and then all the recorders are played backwards.

The range is known, thus the range gates are narrowed. The Doppler is known, and these gates are set accordingly. Also, the direction is known, because of the relative phase coming through the different elements. Hence, when the recorders are played in reverse, all the circuits continue to track on the signal, which is now like a target receding from the observer, rather than one coming toward same. As the target is now being tracked in range, speed and direction, it can thus be tracked much farther away than when first detected. (This phenomenon is observed in conventional radars, where an outgoing target can be tracked to a much greater range than that at which an incoming one can first be detected.) It might even be possible to track it back to its source. If this be the case, no computer is needed for trajectory computation. On the other hand, even if the target cannot be tracked all the way back to its origin, it can be tracked farther than before, thus easing the computation problem.

FIG. 3 represents a block diagram of a negative time phased array radar system. A target is sought by an antenna array 21, comprising a plurality of antennas $22_1$–$22_n$. The raw data from the antennas is recorded in recorders $23_1$–$23_n$. The outputs from antennas $22_1$–$22_n$ are also applied to a phased array receiver 24, which includes means for phase comparison of the incoming signals to cause scanning by the antenna array 21. These networks are conventional phased array networks, as are well known in the art.

The output from phased array receiver 24 is applied to a tracking device 25 via wide searching gates 26, a gate selector 27, and a signal detector 28.

As described hereinbefore with reference to the embodiment of FIG. 1, when a sufficiently strong signal is acquired, the recorders $23_1$–$23_n$ are caused to reverse in direction and switch from record to playback. The recorders are played back through the phased array receiver 24, and through narrow tracking gates 29. The proper tracking direction of the phased array receiver 24 is set by signal detector 28 and by tracking device 25, which also centers the narrow tracking gates 29, as described hereinbefore.

Summarily, the incoming signals are applied to receiver 24, which contains the appropriate steering networks. Upon detection of a target, the recorders 23 are played in reverse through the steering and narrow gating networks to acquire pre-detection path information re the target as before.

As described in FIG. 2, only narrow searching gates can be used, if deemed appropriate.

The recorders shown could each be one of a multiplicity of recording heads on a single tape or disk recorder. The recorders in each of the embodiments may operate at an IF frequency instead of RF, as shown.

As all the raw information is being recorded, the negative time playback contains all the original target information and can be examined by any other criteria of interest, such as special signal modulations useful in separating true targets from decoys, or mortar shells from low-flying aircraft.

Information which may have been available only prior to detection may be recovered using the techniques herein defined, for example the point of origin, spin rate, tumbling, etc., of a bomb or mortar shell which might explode shortly after or at the time of detection and hence not be available for further measurement.

If need be, recorder playback could be at increased speed to shorten computation time to free the system for new target acquisition, permit quick retaliation, etc.

Although to illustrate the invention a radar set is employed, this is not the only means of using the invention. The principles outlined are applicable to a sonar or other acoustic system, to optical systems, etc. Thus, it is to be understood that the embodiments shown are illustrative only, and that many variations and modifications may be made without departing from the principles of the invention herein disclosed and defined by the appended claims.

I claim:

1. In a system for determining pre-detection data on a target, apparatus including means for receiving signals, means coupled to said receiving means for gating said received signals, means for storing said received signals prior to target detection, means for positioning said gating means after target detection, and means for reading out said stored signals after target detection within said positioned gates.

2. In the system of claim 1, said gating means including wideband and narrowband gating.

3. In the system of claim 2, said means gating received signals being wideband gating and said positioned gates being narrowband gating.

4. In the system of claim 3, said means for storing said received signals including a recorder.

5. In the system of claim 1, said gating means including a searching narrow gate.

6. In the system of claim 1, said receiving means including a phased array antenna system.

7. In the system of claim 6, said means for storing including a recorder coupled to each element of said phased array antenna system.

8. A method for acquiring pre-detection data on a target, comprising the steps of:
  electronically searching for said target employing gating,
  recording total inputs during said searching,
  positioning said gating upon detection of said target, and
  playing back in reverse said recorded input through said gating.

9. The method of claim 8, in which wideband gating is employed during searching and narrowband gating during recorder playback.

10. The method of claim 8, in which a single narrow gate is employed during searching, said narrow gate being accurately positioned during recorder playback.

11. In a system for detecting pre-detection data on a target, apparatus including
  means for receiving signals prior to target detection,
  means for storing said signals received prior to target detection, and
  means for examining said stored signals after target detection.

12. In the system of claim 11, said means for examining said stored signals after target detection including means for generating narrowband gates, and means for reading out said stored signals within said narrowband gates.

References Cited
UNITED STATES PATENTS 3,223,996  12/1965  Voles _____ 343—7.3 X
3,354,438  11/1967  Sandlin et al.

RODNEY D. BENNETT, *Primary Examiner.*

T. H. TUBBESING, *Assistant Examiner.*